United States Patent [19]

Prasad

[11] Patent Number: 5,529,616

[45] Date of Patent: Jun. 25, 1996

[54] INK JET INKS CONTAINING MIXTURES OF ALCOHOLS

[75] Inventor: Keshava A. Prasad, San Marcos, Calif.

[73] Assignee: E. I. Du Pont de Nemours and Company, Wilmington, Del.

[21] Appl. No.: 347,231

[22] Filed: Nov. 23, 1994

[51] Int. Cl.$^6$ .................................................. C09D 11/02
[52] U.S. Cl. ........................................ 106/20 R; 106/20 D
[58] Field of Search ................................ 106/20 R, 22 R, 106/20 D

[56] References Cited

U.S. PATENT DOCUMENTS

| | | | |
|---|---|---|---|
| 4,973,499 | 11/1990 | Iwata et al. | 106/22 R |
| 5,085,698 | 2/1992 | Ma et al | 106/20 |
| 5,098,476 | 3/1992 | Baker | 106/22 R |
| 5,165,968 | 11/1992 | Johnson et al. | 106/22 R |
| 5,258,505 | 11/1993 | Eida et al. | 106/22 R |

*Primary Examiner*—Helene Klemanski

[57] ABSTRACT

An ink for ink jet printers which comprises an water; 0.5 to 3% of a mixture of isopropyl alcohol and at least one solvent having a boiling point of less than 130° C. and present in an amount that provides a surface tension of 45 to 55 dynes/cm for the mixture; and a pigment dispersion or a dye. The pigment dispersion consists of pigment particles and a polymeric dispersant. These inks exhibit rapid drying, excellent image definition, are storage stable and have excellent decap properties.

10 Claims, No Drawings

INK JET INKS CONTAINING MIXTURES OF ALCOHOLS

FIELD OF THE INVENTION

This invention relates to aqueous inks for ink jet printers, and more particularly, to aqueous ink jet inks containing a mixture of alcohols as cosolvent to impart rapid media penetration without loss of image definition or inducing pigment flocculation.

BACKGROUND OF THE INVENTION

Ink jet printing is a non-impact and non-contact printing process in which an electronic signal produces droplets of ink that are deposited on a wide variety of substrates such as paper, transparent film, plastics, metals and fabrics. It is extremely versatile in substrate variety, in print quality and in speed of operation. It is digitally controllable. For these reasons, ink jet is widely used industrially for marking and labeling. In the office it has been broadly utilized as output for personal computers. This is especially true for thermal or bubble jet drop-on-demand printers with disposable ink cartridges. These printers have been widely received due to their high print quality, low cost, relatively quiet operation and graphics capability.

Both dyes and pigments have been used as ink colorants for ink jet printers. However, dyes have several disadvantages. They are water-soluble and remain so after drying. They are redissolved by contact with water and will run when exposed to a water spill. Also dye images smear on contact with felt pen markers. In addition they exhibit poor light stability relative to pigments and are known to fade even under conditions of office fluorescent lighting. Thus, there are several disadvantages with the use of dye-based ink jet inks, many of which prohibit their use in applications requiring fast drying times and greater light stability.

Pigment colorants are being increasingly used due to their improved water-and smear resistance, and improved light-fastness, compared to dyes. The inclusions of cosolvents and penetrants to pigment-based inks, however, tends to destabilize pigment dispersions. Thus, pigments are a useful alternative to dye colorants provided the dispersions can be made stable to flocculation and settling.

Three competing factors dominate the formulation of ink for ink jet printers: (1) drying rate, (2) print quality, and (3) reliability. Drying rate determines the throughput rate and therefore productivity of a printer. One major deficiency of thermal ink jet printers is their relatively slow printing speed compared to printers using competing technologies. A major obstacle is the ink drying rate. In a sheet fed printer, the ink must be dry before the succeeding sheet contacts it or the ink will smear.

Drying occurs by both evaporation and penetration. Evaporation is determined by solvent vapor pressure whereas penetration is determined by interfacial energy between the ink and the paper and the porosity of the print media. The use of penetrants is known in the art as a means to increase the rate of penetration of inks. Conventional penetrants such as Butyl Carbitol®, however, tend to cause pigment dispersions to flocculate and have limited use in pigmented ink jet inks.

Print quality can be somewhat subjective in measurement. Basically it is the image definition or contrast verses the nonimage background areas. It is controlled by 2 general factors:

1) Color properties of the ink measured by optical density and color coordinates controlling hue, e.g. L*, A* and B* in the CIELAB 1976 color standards. In the case of black inks the optical density is the most important of these two factors.

2) Non-color image characteristics that determine image definition are: a) resolution, i.e. number of drops of ink per unit area, b) the area coverage per drop, c) edge acuity, and d) presence or absence of artifacts such as satellite droplets, side pennants or feathering. The latter is a critical phenomena because it is often the result of a fast penetrating ink which conducts ink through paper fibers, producing a fuzzy or feathery image. The cosolvents of this invention are able to penetrate rapidly without producing feathering.

An important reliability issue is decap or crust time which is defined as the time span over which a pen can be exposed to the atmosphere without failing to print. Other issues are stability of the ink caused by physical or chemical changes, compatibility with equipment material, robustness towards variability in thermal firing conditions and stable drop volume over long term use.

These three factors often compete with one another. For example, methods for decreasing drying rate tend to adversely affect either print quality or reliability. Selecting a more volatile cosolvent will decrease drying time, but also tends to decrease decap time. Selection of a more penetrating solvent will lower drying rate, but will also lower optical density and induce feathering. Increasing optical density by employing more colorant can adversely effect reliability. Cosolvents are available that increase penetration rate, but many of them will destabilize pigment dispersions.

Accordingly, a need exists for penetrants that will increase ink drying without degrading print quality through feathering and without destabilizing pigment-based inks.

SUMMARY OF THE INVENTION

Applicant has found that a particular mixture of alcohols increases the penetration rate, thereby decreasing drying rate, without inducing feathering, reducing decap time, or decreasing pigment dispersion stability. This mixture does not induce pigment flocculation or settling, or nozzle pluggage, and also is particularly useful in formulating dye-based inks. Accordingly, the present invention provides an aqueous ink jet ink comprising:

(a) water;

(b) 0.5 to 3% by weight of a mixture of isopropyl alcohol and at least one alcohol having a boiling point of less than 130° C. and present in an amount that provides a surface tension of 45 to 55 dynes/cm for the mixture; and (c) a pigment dispersion or a dye.

The inks of the invention are stable, have low viscosity, exhibit excellent print quality, provide excellent smear resistance after drying and good decap or crusting time. They may be used with a variety of ink jet printers such as continuous, piezoelectric, drop-on-demand and thermal or bubble jet drop-on-demand, and are particularly adapted for use in thermal ink jet printers.

DETAILED DESCRIPTION OF THE INVENTION

The invention provides an ink jet ink composition which is particularly suited for use in ink jet printers in general, and thermal ink jet printers in particular. The ink jet ink composition encompasses both pigment-based inks and dye-based inks. The pigmented inks comprise water, a mixture of alcohols as cosolvent and a pigment dispersion which is an aqueous dispersion of pigment particles stabilized by dispersants, usually polymeric dispersants. These inks are stable over long periods, both in storage and in the printer. The dye-based inks comprise water, a dye and a mixture of alcohols as cosolvent. The inks may be adapted to the requirements of a particular ink jet printer to provide a balance of light stability, smear resistance, viscosity, surface tension, high optical density, and crust resistance.

MIXTURE OF ALCOHOLS

The mixture of alcohols fills a need for pigmented ink jet inks having rapid penetration and therefore rapid drying without having deleterious effects on image definition. The inks also have excellent dispersion stability.

Low boiling alcohols are desired to provide a balance between improved dry time and good print quality. The best results are seen with lowest boiling alcohols such as isopropanol with a boiling point of 82° C. However, isopropanol has a low flash-point of 23.9° C. (75° F.) and levels greater than 3% by weight in water lead to flash points less than 141° (Pensky-Martens, closed cup), which is considered flammable under shipping regulations. In order to utilize isopropyl alcohol and avoid flammability issues, isopropyl alcohol is used in combination with higher boiling low flash-point alcohols.

The mixture of alcohols is a mixture of isopropyl alcohol and at least one alcohol having a boiling point lower than 130° C. present in an amount that provides a surface tension of 45 to 55 dynes/cm (preferably 50 to 55 dynes/cm) for the mixture. If the surface tension of the mixture of alcohols is outside this range, the improvement in dry time without degrading print quality is not achieved. At surface tensions of greater than 55 dynes/cm, dry times are unacceptably long, and at surface tensions of less than 45 dynes/cm, print quality is unacceptable.

Some useful alcohols that have a boiling point of less than 130° C., and which may be used in combination with the isopropyl alcohol, include 3-carbon alcohols such as 1-propanol, 2-propene-1-ol, etc.; 4-carbon alcohols such as 1-butyl alcohol, 2-butyl alcohol, 2-methyl-1-propanol, 2-methyl-2-propanol, 2-methyl-2propanol, 2-buten-1-ol, 3-buten-1-ol, 3-buten-2-ol, 2-butyn-1-ol, 3-butyn-1-ol, 3-butyn-2-ol, cyclobutanol, etc.; and 5-carbon alcohols such as 2-pentanol, 3-pentanol, 1-penten-3-ol, 2-penten-1-ol, 3-penten-2ol, 4-penten-2-ol, 2-methyl-l-butanol, 3-methyl-1butanol, 2-methyl-2-butanol, 3-methyl-2-butanol, 2,2- dimethyl-1-propanol, etc. Alcohols having greater than 5 carbon atoms are also useful if they are soluble or can be made soluble in water. Some useful 6-carbon alcohols include 3-methyl-1-pentyn-3-ol, 2-methyl-4- penten-2-ol, etc. Some useful 7-carbon alcohols include 3,4-dimethyl-l-pentyn-3-ol, etc. Preferably the alcohol is selected from the group consisting of neopentyl alcohol, n-butyl alcohol, 3-pentanol and 2-buten-1-ol.

As little as 0.5% by weight of the alcohol mixture has some effect, but about 1.5 to 2% by weight is a preferred range. Up to 3.0% by weight may be used to increase drying rate, but this increased penetration/drying rate must be balanced against increased feathering and decreased dispersion stability. Higher concentrations of the alcohol mixture may result in poor print quality, while lower concentrations will lead to inadequate dry time.

The combination of water and the mixture of alcohols is present in a major amount in the ink composition, i.e., in the range of approximately 65 to 99.89%, preferably approximately 85 to 98.5% based on total weight of the ink. The ink usually contains from about 5% to about 95% water, the preferred ratios are approximately 75% to about 90% water, based on the total weight of the ink.

COLORANTS

The colorants may be a pigment dispersion or a dye. The term pigment dispersion, as is known in the art and as used herein, refers to a mixture of a pigment and a dispersing agent. Preferably, the dispersing agent is a polymeric dispersant compound.

Dyes:

Dyes commonly used in aqueous ink jet inks include for example, Acid, Direct, Food and Reactive dyes. The dyes may be present in an amount of 0.2 to 20% by weight, based on the total weight of the ink.

Some useful dyes that may be mentioned are:

C.I. Food Blacks 1 and 2;

C.I. Acid Blacks 7, 24, 26, 48, 52, 58, 60, 107, 109, 118, 119, 131, 140, 155, 156 and 187;

C.I. Direct Blacks 17, 19, 32, 38, 51, 71, 74, 75, 112, 117, 154, 163 and 168;

C.I. Acid Reds 1, 8, 17, 32, 35, 37, 42, 57, 92, 115, 119, 131, 133, 134, 154, 186, 249, 254 and 256;

C.I. Direct Reds 37, 63, 75, 79, 80, 83, 99, 220, 224 and 227;

C.I. Acid Violets 11, 34 and 75;

C.I. Direct Violets 47, 48, 51, 90 and 94;

C.I. Reactive Reds 4, 23, 24, 31 and 56;

C.I. Acid Blues 9, 29, 62, 102, 104, 113, 117, 120, 175 and 183;

C.I. Direct Blues 1, 6, 8, 15, 25, 71, 76, 78, 80, 86, 90, 106, 108, 123, 163, 165, 199 and 226;

C.I. Reactive Blues 7 and 13;

C.I. Acid Yellows 3, 17, 19, 23, 25, 29, 38, 49, 59, 61 and 72;

C.I. Direct Yellows 27, 28, 33, 39, 58, 86, 100 and 142; and

C.I. Reactive Yellow 2.

Pigment Dispersion:

In the preferred embodiment of the present invention, the colorant is a pigment dispersion. In addition to, or in place of the preferred polymeric dispersant compounds, surfactant compounds may be used as dispersants. These may be anionic, cationic, nonionic, or amphoteric surfactants. A detailed list of non-polymeric as well as some polymeric dispersants are listed in the section on dispersants, pages 110–129, 1990 McCutcheon's Functional Materials, North American Edition, Manufacturing Confection Publishing Co., Glen Rock, N.J., 07452.

Polymeric dispersants suitable for practicing the invention include AB, BAB and ABC block copolymers. In AB or BAB block copolymers the A segment is a hydrophobic (i.e., water insoluble) homopolymer or copolymer which serves to link with the pigment and the B block is a hydrophilic (i.e., water soluble) homopolymer or copolymer, or salts thereof, and serves to disperse the pigment in the aqueous medium. Such polymeric dispersants and the synthesis thereof are disclosed in Ma et al., U.S. Pat. No. 5,085,698 issued Feb. 4, 1992.

Preferred AB block polymers are: methyl methacrylate// methyl methacrylate/methacrylic acid(10//5/7.5), 2-ethylhexyl methacrylate//2-ethylhexyl methacrylate/methacrylic acid(5//5/10), n-butyl methacrylate//n-butyl methacrylate/ methacrylic acid (10//5/10), n-butyl methacrylate//methacrylic acid(10//10), ethylhexyl methacrylate//methyl methacrylate/methacrylic acid (5//10/10), n-butyl methacrylate// 2-hydroxyethyl methacrylate/methacrylic acid(5//10/10), n-butyl methacrylate//2-hydroxyethyl methacrylate/methacrylic acid (15//7.5/3), methyl methacrylate//ethylhexyl methacrylate/methacrylic acid (5//5/10), and butyl methacrylate//butyl methacrylate/dimethylaminoethyl methacrylate(5//5/10). Preferred BAB block polymers are:: n-butyl methacrylate/methacrylic acid//n-butyl methacrylate//n-butyl methacrylate/methacrylic acid (5/10//10//5/10), methyl methacrylate/methacrylic acid//methyl methacrylate//methyl methacrylate/methacrylic acid (5/7.5//10//5/7.5). The double slash indicates a separation between blocks and a single slash indicates a random copolymer. The values in parenthesis represent the degree of polymerization of each monomer.

To solubilize the B block into the aqueous medium, it may be necessary to make salts of either the acid or amino groups contained in the B block. Salts of the acid monomers can be made with the counter component being selected from organic bases such as mono-, di-, tri-methylamine, morpholine, n-methyl morpholine; alcohol amines such as dimethylethanolamine (DMEA), met:hyldiethanolamine, mono-, di-, and tri-ethanolamine; pyridine; ammonium hydroxide; tetra-alkylammonium salts such as tetramethylammonium hydroxide, tetraethylammonium hydroxide; alkali metals such as lithium, sodium and potassium, and the like. Preferred neutralizing agents include dimethylethanolamine and sodium and potassium hydroxides, with potassium hydroxide being particularly preferred for inks to be used in thermal ink jet printers. Salts of the amino monomers can be made with the counter component being selected from organic acids such as acetic acid, formic acid, oxalic acid, dimethylol propionic acid, halogens such as chloride, fluoride, and bromide, and other inorganic acids, such as sulfuric acid, nitric acid, phosphoric acid and the like. It is also possible to convert the amino group into a tetra-alkyl ammonium salt. Amphoteric polymers, that is polymer that contains both an acid group and an amino group, may be used as is or can be neutralized with either addition of acid or base.

ABC triblock polymers useful in preparing pigment dispersions are disclosed in European Patent Application 0 556 649 published on Aug. 25, 1993. Although random copolymers can be used as dispersing agents, they are not as effective in stabilizing pigment dispersions as-the block polymers, and therefore are not preferred.

Useful pigments for the dispersion comprise a wide variety of organic and inorganic pigments, alone or in combination. The term "pigment" as used herein means an insoluble colorant. The pigment particles are sufficiently small to permit free flow of the ink through the ink jet printing device, especially at the ejecting nozzles that usually have a diameter ranging from 10 micron to 50 micron. The particle size also has an influence on the pigment dispersion stability, which is critical throughout the life of the ink. Brownian motion of minute particles will help prevent the particles from settling. It is also desirable to use small particles for maximum color strength. The range of useful particle size is approximately 0,005 micron to 15 micron. Preferably, the pigment particle size should range from 0,005 to 5 micron and most preferably, from 0.01 to 0.3 micron.

The selected pigment may be used in dry or wet form. For example, pigments are usually manufactured in aqueous media and the resulting pigment is obtained as water wet presscake. In presscake form, the pigment is not aggregated to the extent that it is in dry form. Thus, pigments in water wet presscake form do not require as much deaggregation in the process of preparing the inks from dry pigments. Representative commercial dry and presscake pigments that may be used in practicing the invention are disclosed in U.S. Pat. No. 5,085,698 issued Feb. 4, 1992.

Fine particles of metal or metal oxides also may be used to practice the invention. For example, metal and metal oxides are suitable for the preparation of magnetic ink jet inks. Fine particle size oxides, such as silica, alumina, titania, and the like, also may be selected. Furthermore, finely divided metal particles, such as copper, iron, steel, aluminum and alloys, may be selected for appropriate applications.

OTHER INGREDIENTS

The ink may contain other ingredients. For example, the surfactants mentioned above may be used to alter surface tension as well as maximize penetration. However, they may also destabilize the pigment dispersion for pigmented inks. The choice of a specific surfactant is also highly dependent on the type of media substrate to be printed. Appropriate surfactants are readily selected for the specific substrate to be used in printing. In aqueous inks, the surfactants may be present in the amount of 0.01 to 5% and preferably 0.2 to 2%, based on the total weight of the ink.

Biocides may be used in the ink compositions to inhibit growth of microorganisms. Dowicides® (Dow Chemical, Midland, Mich.), Nuosept® (Huls America, Inc., Piscataway, N.J.) , Omidines® (Olin Corp., Cheshire, Conn.) , Nopcocides® (Henkel Corp., Ambler, Pa.), Troysans® (Troy Chemical Corp., Newark, N.J.) and sodium benzoate are examples of such biocides.

In addition, sequestering agents such as EDTA may also be included to eliminate deleterious effects of heavy metal impurities.

Other known additives, such as humectants, viscosity modifiers and other acrylic or non-acrylic polymers made also be added to improve various properties of the ink compositions.

INK PREPARATION

The pigmented ink is prepared by premixing the selected pigment(s) and dispersant in water. In the case of dyes some of the same factors apply except that there is no dispersant present and no need for pigment deaggregation. The dye-based ink is prepared in a well agitated vessel rather than in dispersing equipment. The alcohol mixture as well as other cosolvents may be present during the dispersion.

The dispersing step may be accomplished in a horizontal mini mill, a ball mill, an attritor, or by passing the mixture through a plurality of nozzles within a liquid jet interaction chamber at a liquid pressure of at least 1000 psi to produce a uniform dispersion of the pigment particles in the aqueous carrier medium.

It is generally desirable to make the pigmented ink jet ink in concentrated form. The concentrated pigmented ink jet ink is subsequently diluted to the appropriate concentration for use in the ink jet printing system. This technique permits preparation of a greater quantity of pigmented ink from the equipment. If the pigment dispersion is made in a solvent, it is diluted with water and optionally other solvents to obtain the appropriate concentration. If the pigment dispersion is made in water, it is diluted with either additional water or water soluble solvents to make a pigment dispersion of the desired concentration. By dilution, the ink is adjusted to the desired viscosity, color, hue, saturation density, and print area coverage for the particular application.

In the case of organic pigments, the ink may contain up to approximately 30% pigment by weight, but will generally be in the range of approximately 0.1 to 15%, preferably approximately 0.1 to 8%, by weight of the total ink composition for most thermal ink jet printing applications. If an inorganic pigment is selected, the ink will tend to contain higher weight percentages of pigment than with comparable inks employing organic pigment, and may be as high as approximately 75% in some cases, because inorganic pigments generally have higher specific gravities than organic pigments. The acrylic block polymer is present in the range of approximately 0.1 to 30% by weight of the total ink composition, preferably in the range of approximately 0.1% to 8%. If the amount of polymer becomes too high, the ink color density will be unacceptable and it will become difficult to maintain desired ink viscosity. Dispersion stability of the pigment particles is adversely affected if insufficient acrylic block copolymer is present. The amount of water plus the alcohol mixture is in the range of approximately 70 to 99.8%, preferably approximately 94 to 99.8%, based on total weight of the ink when an organic pigment is selected, approximately 25 to 99.8%, preferably approximately 70 to 99.8% when an inorganic pigment is selected and 80 to 99.8% when a dye is selected.

Other additives, such as surfactants, biocides, humectants, chelating agents, and viscosity modifiers may be added to the ink. Optionally, other acrylic and non-acrylic polymers, may be added to improve properties such as water fastness and smear resistance.

Jet velocity, separation length of the droplets, drop size, and stream stability are greatly affected by the surface tension and the viscosity of the ink. Pigmented ink jet inks suitable for use with ink jet printing systems should have a surface tension in the range of about 20 dyne/cm to about 70 dyne/cm and, more preferably, in the range 30 dyne/cm to about 70 dyne/cm. Acceptable viscosities are no greater than 20 cP, and preferably in the range of about 1.0 cP to about 10.0 cP. The ink has physical properties compatible with a wide range of ejecting conditions, i.e., driving voltage and pulse width for thermal ink jet printing devices, driving frequency of the piezo element for either a drop-on-demand device or a continuous device, and the shape and size of the nozzle. They may be used with a variety of ink jet printers such as continuous, piezoelectric drop-on-demand and thermal or bubble jet drop-on-demand, and are particularly adapted for use in thermal ink jet printers. The inks have excellent storage stability for a long period and do not clog in an ink jet apparatus. Fixing the ink on the image recording material, such as, paper, fabric, film, etc., can be carried out rapidly and accurately.

The printed ink images have clear color tones, high density, excellent water resistance and lightfastness. Furthermore, the ink does not corrode parts of the ink jet printing device it comes in contact with.

EXAMPLES

The following examples further illustrate but do not limit the invention.

Inks were prepared as follows:

Preparation of Poly(methacrylic acid-b-benzyl methacrylate-co-methyl methacrylate-b-ethoxytriethylene glycol methacrylate), MAA//BzMA//ETEGMA (13//12//4):

(Note: A double slash indicates a separation between the blocks and a single slash indicates a random copolymer. The values recited in parenthesis represent the degree of polymerization for each monomer.)

To a solution of 46.5 g (266.5 mmol) of 1-methoxy1-trimethylsiloxy-2-methyl-1-propene and 8.0 mL of tetrabutyl ammonium m-chlorobenzoate (1.0 M solution in acetonitrile) in 800 mL THF was slowly added 548.4 g (619.4 mL, 3.465 mol) of trimethylsilyl methacrylate in 45 minutes under nitrogen atmosphere. The temperature rose from 26° C. to 52.3° C. during the course of the addition. When the temperature fell to 38.2° C., 20 minutes later, 0.5 mL of tetrabutyl ammonium m-chlorobenzoate solution was added. No exotherm was detected. To the reaction mixture was then slowly added 608.4 g (602.4 mL, 3.198 mol) of 2-phenylethyl methacrylate (dried over molecular sieves) in 30 minutes. The temperature rose to 50.3° C. during the course of the addition. When the temperature fell to 36° C., about 30 minutes later, 0.5 mL of tetrabutyl ammonium m-chlorobenzoate was added and no exotherm was detected. To the reaction mixture was then added 265.7 g (265.7 mL, 1.066 mol) of ethoxytriethyleneglycol methacrylate (dried over molecular sieves) over 20 minutes. The temperature rose to 42.2° C. The reaction mixture was stirred for 4 hours. It was quenched with 400 mL of methanol and stirred overnight. The volatiles were stripped off on a rotavap under vaccuo to give 1,180 g of a white solid.

Preparation of pigment dispersion using block polymer MAA//PEMA//ETEGMA (13//12//4):

A black pigment dispersion was prepared using the following procedure:

| Ingredient | Amount (grams) |
| --- | --- |
| FW18, Carbon black pigment (Degussa Corp., Allendale, NJ 07041) | 150 |
| Polymer obtained from above, (40.5% solution) | 185.2 |
| 2-Pyrrolidone | 90 |
| Deionized water | 552.8 |

The above mentioned components were premixed in a plastic beaker by mechanical stirring until no lumps or dry clumps were visible. The mixture was dispersed in a microfluidizer (Microfluidics Corp., Watham, Mass.) by passing it through the interaction chamber 5 times under a liquid pressure of about 8,000 psi. The resulting pigment dispersion had a 15% pigment concentration with an average particle size of 100 to 115 nm as determined by Brookhaven BI-90 particle sizer. The dispersion was filtered through a 1 micron high efficiency filter bag (3M Filtration Products, St. Paul, MN 55144-1000). The final pH was 7.8. to 8.2.

Example 1

Preparation of Inks:
Inks were prepared by mixing the following ingredients:

TABLE 1

| INGREDIENT | AMOUNT IN GRAMS SAMPLE # | | | | | | | | | |
|---|---|---|---|---|---|---|---|---|---|---|
| | 1 (control) | 2 | 3 | 4 | 5 | 6 | 7 | 8 | 9 | 10 |
| Liponics® EG-1, Lipo Chemical Company, Patterson, NJ | 5.0 | 5.0 | 5.0 | 5.0 | 5.0 | 5.0 | 5.0 | 5.0 | 5.0 | 5.0 |
| Polymer dispersion | 4.5 | 4.5 | 4.5 | 4.5 | 4.5 | 4.5 | 4.5 | 4.5 | 4.5 | 4.5 |
| 2-Pyrrolidone | 4.3 | 4.3 | 4.3 | 4.3 | 4.3 | 4.3 | 4.3 | 4.3 | 4.3 | 4.3 |
| Biocide | 0.45 | 0.73 | 0.73 | 0.73 | 0.73 | 0.73 | 0.73 | 0.73 | 0.73 | 0.73 |
| Deionized water | 82.8 | 83.3 | 83.6 | 83.1 | 83.1 | 82.1 | 84.1 | 83.1 | 83.1 | 83.1 |
| Isopropyl alcohol | 3.0 | 2.0 | 1.0 | 1.0 | 1.0 | 1.5 | | | | |
| Neopentyl alcohol | | 0.2 | 0.5 | | | | 1.0 | | | |
| n-Butyl alcohol | | | | 1.0 | | | | 2.0 | | |
| 3-Pentanol | | | | | 1.0 | | | | 2.0 | |
| 2-Buten-1-ol | | | | | | 1.5 | | | | 2.0 |
| SURFACE TENSION OF ALCOHOL MIXTURE | 55 | 51 | 50 | 52 | 49 | 47 | 50 | 52 | 48 | 51 |

The inks were tested by loading them in thermal ink jet pens having a resistor size of 30 to 40 microns and an orifice of 25 to 30 microns. The pens were placed in an ink jet printer with no heat source in the print zone.

A full page of double density 1.2 cm (0.5 inch) squares was printed on a variety of office papers in order to simulate a worst case condition. The dry time was measured by stacking a clean sheet of paper on top of the printed paper and evaluating the amount of ink transferred onto the backside of the unprinted paper at a known interval of time. The amount of ink transferred was evaluated based on visual blot rating based on a scale of 0 to 4, where 0 represents no ink transferred and 4 represents a high amount of ink transferred. A blot reading of less than or equal to 1 was deemed acceptable. Acceptable dry time for 2 pages/minute printing, with no heat, of a high density plot: was 55 seconds at worse case conditions (high drop volume, worst paper and environment). Results are shown in Table 2 below.

What is claimed is:

1. An aqueous ink jet ink comprising:
   (a) water;
   (b) 0.5 to 3% by weight of a mixture of isopropyl alcohol and at least one alcohol having a boiling point of less than 130° C. and present in an amount that provides a surface tension of 45 to 55 dynes/cm for the mixture; and
   (c) a colorant comprising a pigment dispersion.

2. The aqueous ink of claim 1 containing a pigment dispersion comprising a pigment and a dispersant.

3. The ink composition of claim 2 wherein the dispersant is a polymeric dispersant.

4. The ink composition of claim 3 wherein said polymeric dispersant is a block copolymer, and wherein the ink composition comprises approximately 0.1 to 8% pigment, 0.1 to 8% block copolymer, and 94 to 99.8% water and alcohol mixture (b) wherein said percentages are by weight.

TABLE 2

| | WEYERHEUSER FIRST CHOICE® | | CHAMPION DATACOPY® | | HAMMERMILL® | |
|---|---|---|---|---|---|---|
| SAMPLE # | DRY TIME (SEC) | PRINT QUALITY | DRY TIME (SEC) | PRINT QUALITY | DRY TIME (SEC) | PRINT QUALITY |
| 1 | 90 | 7.5 | 78 | 7.0 | 0 | 4.5 |
| 2 | 60 | 7.5 | 55 | 7.0 | 0 | 4.0 |
| 3 | 63 | 7.5 | 57 | 7.0 | 0 | 4.0 |
| 4 | 55 | 7.5 | 50 | 6.5 | 0 | 3.5 |
| 5 | 57 | 7.0 | 53 | 6.5 | 0 | 3.5 |
| 6 | 48 | 7.0 | 45 | 6.5 | 0 | 3.0 |
| 7 | 59 | 7.0 | 53 | 6.5 | 0 | 2.5 |
| 8 | 57 | 7.0 | 51 | 6.0 | 0 | 2.5 |
| 9 | 55 | 7.0 | 47 | 6.0 | 0 | 2.5 |
| 10 | 50 | 7.0 | 44 | 6.0 | 0 | 2.5 |

5. The aqueous ink of claim 1 wherein the mixture contains at least one alcohol having at least 4 carbon atoms.

6. The aqueous ink of claim 1 wherein the mixture contains at least one alcohol having at least 5 carbon atoms.

7. The aqueous ink of claim 1 containing an alcohol selected from the group consisting of neopentyl alcohol, n-butyl alcohol, 3-pentanol and 2-buten-1-ol.

8. The ink of claim 1 wherein said alcohol mixture comprises approximately 1.5 to 2% by weight of the ink and has a surface tension of approximately 50 to 55 dynes/cm.

9. The ink of claim 8 wherein the colorant is a pigment dispersion comprising pigment particles and a polymeric dispersant.

10. The ink of claim 9 wherein component (b) is a mixture of isopropyl alcohol and at least one alcohol having 4 or 5 carbon atoms.

* * * * *